United States Patent [19]

Delarue et al.

[11] 3,928,341

[45] Dec. 23, 1975

[54] N-AMINOALKYL-4-ANILINO PYRIDINES

[75] Inventors: Jean-Louis Delarue; Albert Debarge, both of Paris, France

[73] Assignee: Merrell Toraude, Paris, France

[22] Filed: Jan. 27, 1972

[21] Appl. No.: 221,382

Related U.S. Application Data

[62] Division of Ser. No. 720,474, April 11, 1968, abandoned.

[52] U.S. Cl................... 260/247.5 G; 260/268 H; 260/293.69; 260/296 R; 424/248
[51] Int. Cl.[2]........................................ C07D 295/12
[58] Field of Search.. 260/296 R, 247.5 R, 247.5 G, 260/293.69, 268 H

[56] References Cited
UNITED STATES PATENTS

| | | | |
|---|---|---|---|
| 2,784,195 | 3/1957 | Burtner | 260/296 R |
| 2,785,172 | 3/1957 | Burtner | 260/296 R |
| 2,785,173 | 3/1957 | Burtner | 260/296 R |
| 2,802,008 | 8/1957 | Burtner | 260/296 R |

*Primary Examiner*—Donald G. Daus
*Assistant Examiner*—Jose Tovar
*Attorney, Agent, or Firm*—William J. Stein; Eugene O. Retter; George W. Rauchfuss, Jr.

[57] ABSTRACT

Novel N-amino-substituted 4-anilinopyridines are provided which have useful central nervous system activity particularly as excitants and anti-depressants. There are also disclosed pharmaceutical compositions containing the novel compounds and methods for making such compounds, the compounds having the formula:

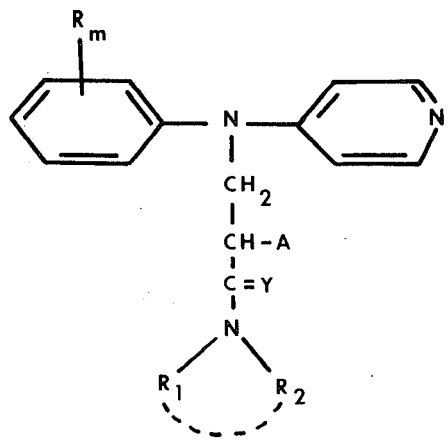

in which
R is hydrogen, halogen, in particular chlorine, a lower alkyl radical, preferably with $C_1$–$C_4$, a lower acyl radical, preferably with $C_1$–$C_4$, a trifluoromethyl radical, a nitro group, a primary, secondary or tertiary amino group, or a nitrile, carboxamide, carboxy or carbalkoxy group;

$m$ is 1, 2 or 3, the substituent(s) R being substituted symmetrically or asymmetrically in the phenyl nucleus and, where $m$ is 2 or 3, being the same or different;

A is hydrogen or a methyl group;

$R_1$ is an alkyl radical with $C_1$–$C_4$;

$R_2$ is an alkyl radical with $C_1$–$C_4$, the same as or different from $R_1$ or $R_1$ and $R_2$ together with the nitrogen atom to which they are attached form a 5- or 6-membered heterocyclic ring which may contain 1 or 2 additional hetero atoms, such as nitrogen, oxygen or sulphur, this heterocyclic group preferably being a substituted or unsubstituted morpholino group.

7 Claims, No Drawings

N-AMINOALKYL-4-ANILINO PYRIDINES

This is a division of application Ser. No. 720,474 filed on Apr. 11, 1968, now abandoned.

This invention is concerned with novel N-animo-substituted 4-anilino-pyridines, with a method for their preparation and with pharmaceutical compositions containing them.

We have found that a class of novel N-amino-substituted 4-anilino-pyridines have valuable central nervous system activity, more particularly excitant and anti-depressive activity; these compounds have the formula:

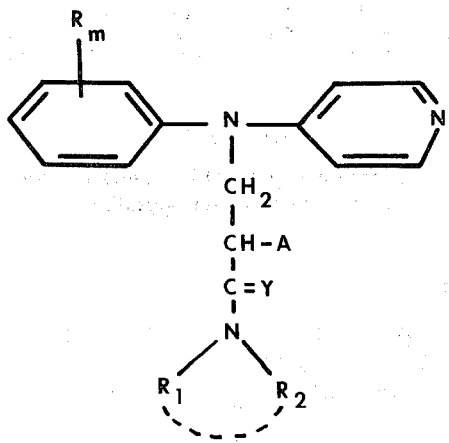

in which:
R is hydrogen, halogen, in particular chlorine, a lower alkyl radical, preferably with $C_1$-$C_4$, a lower acyl radical, preferably with $C_1$-$C_4$, a trifluoromethyl radical, a nitro group, a primary, secondary or tertiary amino group, or a nitrile, carboxamide, carboxy or carbalkoxy group; m is 1, 2 or 3, the substituent(s) R being substituted symmetrically or asymmetrically in the phenyl nucleus and, where m is 2 or 3, being the same or different;

A is hydrogen or a methyl group;

Y is an oxygen atom or two hydrogen atoms;

$R_1$ is an alkyl radical with $C_1$-$C_4$;

$R_2$ is an alkyl radical with $C_1$-$C_4$, the same as or different from $R_1$ or a heterocycle-methyl radical, preferably alpha-furyl-methyl, or $R_1$ and $R_2$ together with the nitrogen atom to which they are attached form a 5- or 6-membered heterocyclic ring which may contain 1 or 2 additional hetero atoms, such as nitrogen, oxygen or sulphur, this heterocyclic group preferably being a substituted or unsubstituted morpholino group.

The same pharmacological activity is shown by the acid addition salts of the compounds of formula I.

The compounds of formula I and their acid addition salts are novel compounds and constitute one aspect of the present invention.

The compounds of formula I in which Y is two hydrogen atoms can be prepared by reacting a 4-anilino-pyridine of the formula:

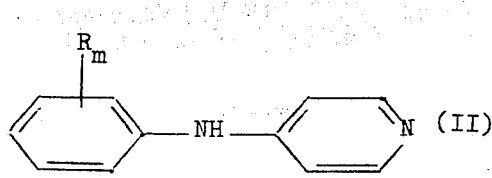

in which R and m have the above-stated meanings, with an ω-haloalkyl amine of the formula:

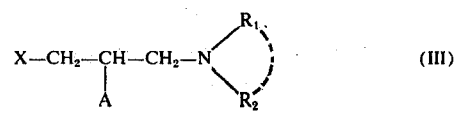

in which X is a halogen atom, preferably chlorine, and A, $R_1$, and $R_2$ have the above-stated meanings, in the presence of an acid binding agent, preferably sodium amide, and an inert organic solvent, preferably dimethyl formamide.

The product of the reaction is usually distilled under reduced pressure and obtained in the crystalline state in the form of a salt by combination with an organic acid.

The compounds of formula I in which Y is an oxygen atom can be prepared by a process which comprises (i) condensing a 4-anilino-pyridine of formula II with acrylonitrile to obtain a nitrile of the formula:

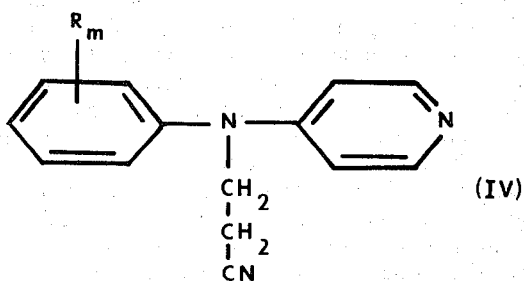

in which R and m have the above-stated meanings, (ii) hydrolysing the nitrile of formula IV to convert the nitrile function into a carboxylic acid function, thus obtaining an acid of the formula:

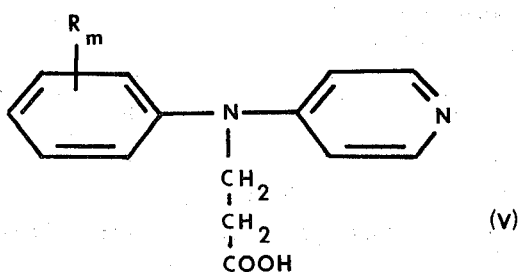

and (iii) condensing the latter with an amine of the formula:

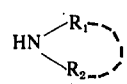

in which $R_1$ and $R_2$ have the above-stated meanings.

The present invention also comprises a pharmaceutical composition comprising one or more compounds of formula I or acid addition salts thereof and an inert, physiologically acceptable carrier.

In order that the invention may be more fully understood, the following examples are given by way of illustration only:

EXAMPLE 1

$N^1$-[3'-($N^2,N^2$-dimethylamino)-propyl]-$N^1$-[phenyl]-4-amino-pyridine

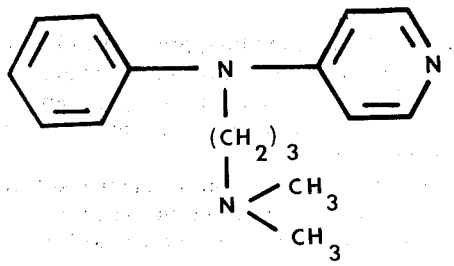

5.6 g of 4-anilino-pyridine (1/30 mol) in 80 cc of anhydrous dimethyl formamide were poured into a 250 cc three-necked flask provided with a mechanical stirrer and a condenser equipped with a moisture guard. The mixture was warmed until a clear solution was obtained. 1.7 g of sodium amide (1/30 mol. + 30%) were then added in a single addition and the whole was left for one hour at ambient temperature. 4.8 g of 1-chloro-3-dimethylamino-propane (1/30 mol. + 20%) were then added. After 8 hours at ambient temperature, the whole was heated to 50°C for 24 hours. The mixture was filtered through filter paper to remove the sodium chloride formed and the excess amide. The clear dimethyl formamide solution was concentrated and the residue was dissolved in four volumes of ether. The ethereal solution was placed in a refrigerator at 0°C for a little time. An insoluble product mainly consisting of the starting material separated. The ethereal solution was filtered and concentrated. The residual oil was distilled under vacuum. B.p. 190°C at 0.05 mm Hg.

The product was isolated in the form of disalicylate. Melting point: 144°C, recrystallised in isopropanol. Analysis: $C_{30}H_{33}N_3O_6$ (mol. wt. = 531.618)

|  | C% | H% | N% | O% |
|---|---|---|---|---|
| Theory: | 67.92 | 6.24 | 7.90 | 18.06 |
| Found: | 67.79 | 6.24 | 7.79 | 18.23 |

EXAMPLE 2

$N^1$-[3'-morpholino-propyl]-$N^1$-[meta-chlorophenyl]-4-amino-pyridine

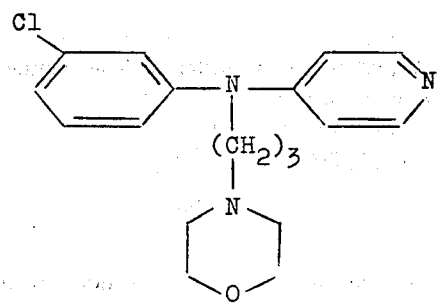

14 g of 4-(meta-chloroanilino)-pyridine (1/15 mol.) in 80 cc of anhydrous dimethyl formamide were reacted as in Example 1 with 3.4 g of sodium amide (1/15 mol. + 30%) and 13 g of 1-chloro-3-morpholino-propane (1/15 mol. + 20%). The whole was left for 8 hours at ambient temperature and then for 24 hours on a water bath at 70°–80°C. After treatment and distillation, 17 g of an oil distilling at 220°–230°C at 0.05 mm Hg were obtained. Yield: 77%.

The product was isolated in the form of disalicylate, m.p. 133°C recrystallised in ethyl acetate.

$C_{32}H_{34}N_3ClO_7$ (molecular weight = 608.103)

|  | C% | H% | N% | Cl% | O% |
|---|---|---|---|---|---|
| Theory: | 63.20 | 5.63 | 6.91 | 5.83 | 18.41 |
| Found: | 63.05 | 5.45 | 6.82 | 5.85 | 18.45 |

EXAMPLE 3

$N^1$-(3'-N-morpholino-propyl)-$N^1$-(meta-trifluoromethylphenyl)-4-amino-pyridine

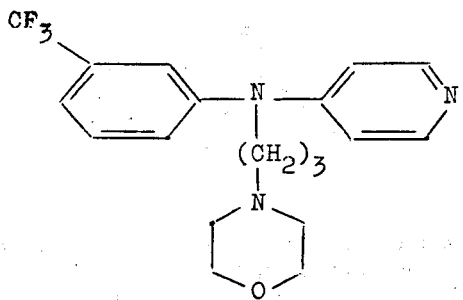

A solution of 23 g of 4-(m-trifluoromethyl-anilino)-pyridine (1/10 mole) in 120 cc of anhydrous dimethylformamide was introduced into a 250 cc three-necked flask provided with a mechanical agitator and a condenser having a moisture trap. A clear solution was obtained at ambient temperature. 5 g of sodium amide (30% excess) were then introduced in a single addition and the mixture was stirred at ambient temperature for 3 hours. 19.5 g of 1-chloro-3-morpholino-propane (1/10 mol + 20% excess) were then added. After 8 hours at ambient temperature, the mixture was stirred for a further 32 hours at 60°. The sodium chloride precipitate was separated. The dimethyl formamide was concentrated to give a syrupy oil. It was dissolved in 4 volumes of ether and the ethereal solution was decanted and placed in a refrigerator for 24 hours. A solid residue was separated, consisting mainly of the 4-anilino-pyridine starting material. The ethereal solution was concentrated, the residual oil was distilled at a pressure of 0.01 mm Hg and the middle fraction, which distilled at from 220° to 250° was taken. Weight - 20 g (Yield - 55%).

The disalicylate of $N^1$-(3'-N-morpholino-propyl)-$N^1$-(meta-trifluoromethyl-phenyl)-4-amino-pyridine was recrystallised from isopropanol; m.p. 128°.

Analysis: $C_{33}H_{34}N_3F_3O_7$ : 641.656

|  | C% | H% | N% | F% |
|---|---|---|---|---|
| Theory: | 61.77 | 5.34 | 6.55 | 8.88 |
| Found: | 61.72 | 5.42 | 6.74 | 8.75 |

EXAMPLE 4

$N^1$-(2'-methyl-3'-(N-morpholino)-propyl)-$N^1$-(meta-chlorophenyl)-4-amino-pyridine

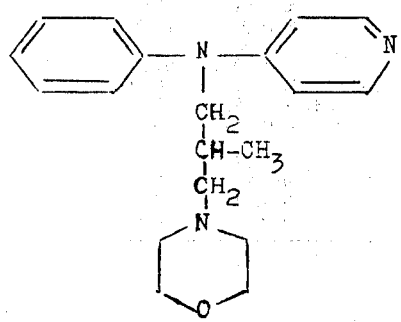

In a similar manner to the previous example, 20.5 g of 4-(meta-chloro-anilino)-pyridine (1/10 mol.) in 120 cc anhydrous dimethyl formamide were reacted with 21.5 g of 1-chloro-2-methyl-3-morpholino-propane (1/10 mol. + 20%) in the presence of 5 g of sodium amide (1/10 mol. + 30% excess). The reaction was carried out under the same conditions of time and temperature as in Example I. Distillation of the final mixture yielded 17 g of an oil boiling at 220°–230° to 0.05 mm Hg. Yield: 50%.

The dimaleate of above product was crystallised from acetone: m.p. = 63°.

Analysis: $C_{27}H_{32}N_3Cl\ O_9 = 578.037$

|  | C% | H% | N% | Cl% | O% |
|---|---|---|---|---|---|
| Theory: | 56.10 | 5.58 | 7.27 | 6.13 | 24.91 |
| Found: | 55.94 | 5.61 | 6.93 | 5.74 | 24.31 |

EXAMPLE 5 – 43

The compounds of Examples 5 to 43 shown in Tables I to X below were prepared in a manner similar to that described in Examples 1 to 4; the compounds are indicated in each table according to the particular substitution in the phenyl ring of their structure and according to the group joined to the nitrogen atom of the anilino group. Each table also includes a description of the salt which was isolated, with its constants, melting point, and analysis.

TABLE I

| Z | Example No. | Salt | m.p. of salt °C | Analysis Theory % | Found % |
|---|---|---|---|---|---|
| CH₂—CH₂—CH₂—N(CH₃)(CH₃) | 5 | fumarate | 108 | C:57.24<br>H: 5.72<br>N: 7.70<br>O:29.32 | 57.11<br>6.24<br>7.97<br>27.73 |
| CH₂—CH₂—CH₂—N(piperidino) | 6 | salicylate | 155 | C:69.33<br>H: 6.52<br>N: 7.35<br>O:16.79 | 69.45<br>6.65<br>7.46<br>16.94 |
| CH₂—CH₂—CH₂—N(morpholino) | 7 | salicylate | 132 | C:67<br>H: 6.15<br>N: 7.32<br>O:19.52 | 66.83<br>6.18<br>7.25<br>19.94 |
| CH₂—CH₂—CH₂—N(pyrrolidino) | 8 | salilcylate | 140 | C:68.92<br>H: 6.32<br>N: 7.53<br>O:17.21 | 68.81<br>6.31<br>7.34<br>17.47 |

TABLE II

| Z | Example No. | Salt | m.p. of salt °C | Analysis Theory | Found |
|---|---|---|---|---|---|
| CH₂—CH₂—CH₂—N(Ch₃)(CH₃) | 9 | salicylate | 165 | C:69.30<br>H: 6.76<br>N: 8.81<br>O:15.10 | 69.22<br>6.56<br>8.74<br>15.31 |
| CH₂—CH₂—CH₂—N(piperidino) | 10 | salicylate | 159 | C:69.72<br>H: 6.71<br>N: 7.17<br>O:16.39 | 69.84<br>6.81<br>7.12<br>16.42 |

TABLE II-continued

Structure: 3-pyridyl-N(Z)-(2-methylphenyl)amine

| Z | Example No. | Salt | m.p. of salt °C | Analysis Theory | Found |
|---|---|---|---|---|---|
| CH₂—CH₂—CH₂—N(morpholino) | 11 | salicylate | 140 | C:67.44<br>H: 6.34<br>N: 7.15<br>O:19.05 | 67.39<br>6.29<br>7.06<br>19.70 |
| CH₂—CH₂—CH₂—N(pyrrolidino) | 12 | salicylate | 105 | C:69.33<br>H: 6.52<br>N: 7.35<br>O:16.79 | 69.50<br>6.74<br>7.55<br>16.72 |
| CH₂—CH₂—CH₂—N(C₂H₅)₂ | 13 | salicylate | 123 | C:69.08<br>H: 6.85<br>N: 7.32<br>O:16.73 | 69.04<br>7<br>7.44<br>16.69 |

TABLE III

Structure: 4-pyridyl-N(Z)-(2-methylphenyl)amine

| Z | Example No. | Salt | m.p. of salt °C | Analysis Theory | Found |
|---|---|---|---|---|---|
| CH₂—CH₂—CH₂—N(CH₃)₂ | 14 | salicylate | 114 | C:68.24<br>H: 6.46<br>N: 7.70<br>O:17.59 | 67.72<br>6.43<br>7.73<br>18.04 |
| CH₂—CH₂—CH₂—N(piperidino) | 15 | salicylate | 156 | C:69.72<br>H: 6.71<br>N: 7.17<br>O:16.39 | 69.72<br>6.83<br>7.10<br>16.39 |
| CH₂—CH₂—CH₂—N(morpholino) | 16 | salicylate | 129 | C:67.44<br>H: 6.34<br>N: 7.15<br>O:19.05 | 67.38<br>6.17<br>7.09<br>19.11 |
| CH₂—CH₂—CH₂—N(pyrrolidino) | 17 | salicylate | 130 | C:69.33<br>H: 6.52<br>N: 7.35<br>O:16.79 | 69.23<br>6.41<br>7.47<br>16.86 |
| CH₂—CH₂—CH₂—N(C₂H₅)₂ | 18 | salicylate | 113 | C:69.08<br>H: 6.85<br>N: 7.32<br>O:16.73 | 69.07<br>6.79<br>7.42<br>16.65 |

TABLE IV

Structure: pyridyl-N(Z)-(2,6-dimethylphenyl)amine

| Z | Example No. | Salt | m.p. of salt °C | Analysis Theory % | Found % |
|---|---|---|---|---|---|
| CH₂—CH₂—CH₂—N(CH₃)₂ | 19 | salicylate | 100 | C:68.68<br>H: 6.67<br>N: 7.51<br>O:17.15 | 68.24<br>6.60<br>7.53<br>17.55 |
| | | | | C:70.09 | 70.20 |

TABLE IV-continued (2,6-dimethylphenyl)(pyridin-4-yl)amine with N-Z substituent

| Z | Example No. | Salt | m.p. of salt °C | Analysis Theory % | Found% |
|---|---|---|---|---|---|
| CH₂—CH₂—CH₂—N(piperidine) | 20 | salicylate | 136 | H: 6.89<br>N: 7<br>O:16 | 6.87<br>7.05<br>16.10 |
| CH₂—CH₂—CH₂—N(morpholine) | 21 | salicylate | 139 | C:67.86<br>H: 6.53<br>N: 6.98<br>O:18.61 | 67.85<br>6.53<br>7.14<br>18.74 |

TABLE V (2-chlorophenyl)(pyridin-4-yl)amine with N-Z substituent

| Z | Example No. | Salt | m.p. of salt °C | Analysis Theory % | Found % |
|---|---|---|---|---|---|
| CH₂—CH₂—CH₂—N(CH₃)₂ | 22 | salicylate | 145 | C:63.66<br>H: 5.70<br>N: 7.42<br>Cl:6.26<br>O:16.96 | 63.56<br>5.91<br>7.37<br>6.10<br>16.82 |
| CH₂—CH₂—CH₂—N(piperidine) | 23 | salicylate | 164 | C:65.39<br>H: 5.98<br>N: 6.93<br>Cl:5.84<br>O:15.83 | 65.49<br>5.93<br>6.84<br>5.74<br>16.08 |
| CH₂—CH₂—CH₂—N(morpholine) | 24 | salicylate | 118 | C:63.20<br>H: 5.63<br>N: 6.91<br>Cl:5.83<br>O:18.41 | 63.27<br>5.80<br>7.03<br>5.70<br>18.44 |
| CH₂—CH₂—CH₂—N(pyrrolidine) | 25 | salicylate | 140 | C:64.91<br>H: 5.78<br>N: 7.09<br>Cl:5.98<br>O:16.21 | 65.03<br>5.94<br>7.08<br>5.85<br>16.19 |

TABLE VI (3-chlorophenyl)(pyridin-4-yl)amine with N-Z substituent

| Z | Example No. | Salt | m.p. of salt °C | Analysis Theory % | Found % |
|---|---|---|---|---|---|
| CH₂—CH₂—CH₂—N(CH₃)₂ | 26 | salicylate | 156 | C:63.66<br>H: 5.70<br>N: 7.42<br>Cl:6.26<br>O:16.96 | 63.77<br>5.80<br>7.25<br>6.22<br>17.13 |
| CH₂—CH₂—CH₂—N(piperidine) | 27 | salicylate | 152 | C:65.39<br>H: 5.98<br>N: 6.93<br>Cl:5.84<br>O:15.83 | 65.23<br>5.96<br>6.72<br>5.74<br>16.04 |

TABLE VI-continued

Structure: 3-Cl-phenyl-N(Z)-pyridyl

| Z | Example No. | Salt | m.p. of salt °C | Analysis Theory % | Found % |
|---|---|---|---|---|---|
| CH₂—CH₂—CH₂—N(morpholine) | 28 | maleate | 135 | C:53.71 H:5.38 N:8.08 Cl:5.11 O:27.70 | 53.86 5.48 7.92 4.97 27.52 |
| CH₂—CH(CH₃)—CH₂—N(2,6-dimethylmorpholine) | 29 | salicylate | 144 | C:65.67 H:6.69 N:8.20 Cl:6.92 O:12.49 | 65.60 6.76 8.06 6.74 12.60 |
| CH₂—CH₂—CH₂—N(2,6-dimethylmorpholine) | 30 | salicylate | 114 | C:64.19 H:6.02 N:6.60 Cl:5.57 O:17.60 | 64.08 6.54 5.48 4.74 19.24 |
| CH₂—CH₂—CH₂—N(CH₃)—CH₂—(tetrahydrofuryl) | 31 | salicylate | 110 | C:64.19 H:6.02 N:6.60 Cl:5.57 O:17.60 | 64.01 6.13 6.64 5.47 17.66 |

TABLE VII

Structure: 2-C₂H₅-phenyl-N(Z)-pyridyl

| Z | Example No. | Salt | m.p. of salt °C | Analysis Theory % | Found % |
|---|---|---|---|---|---|
| CH₂—CH₂CH₂—N(CH₃)₂ | 32 | salicylate | 144 | C:68.68 H:6.67 N:7.51 O:17.15 | 68.79 7.06 7.40 16.54 |
| CH₂—CH₂—CH₂—N(piperidine) | 33 | salicylate | 170 | C:70.09 H:6.89 N:7 O:16 | 70.08 6.96 7.07 16.25 |
| CH₂—CH₂—CH₂—N(morpholine) | 34 | salicylate | 133 | C:67.86 H:6.53 N:6.98 O:18.61 | 67.85 6.55 6.95 18.75 |

TABLE VIII

Structure: CF₃-phenyl-N(Z)-pyridyl

| Z | Example No. | Salt | m.p. of salt °C | Analysis Theory % | Found % |
|---|---|---|---|---|---|
| CH₂—CH(CH₃)—CH₂—N(piperidine) | 35 | salicylate | 129 | C:62.65 H:5.84 N:8.12 F:11.01 | 62.47 5.71 7.98 10.94 |

TABLE VIII—Continued

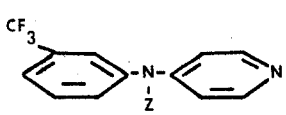

| Z | Example No. | Salt | m.p. of salt °C | Analysis Theory % | Found % |
|---|---|---|---|---|---|
| CH₂—CH₂—CH₂—N(morpholine with CH₃,CH₃) | 36 | salicylate | 75 | C:62.77<br>H: 5.72<br>N: 6.27<br>F: 8.51<br>O:16.72 | 62.70<br>5.80<br>6.35<br>8.60 |
| CH₂—CH—CH₂—N(morpholine with CH₃,CH₃), CH₃ | 37 | salicylate | 153 | C:63.84<br>H: 6.28<br>N: 7.70<br>F:10.44 | 63.89<br>6.30<br>7.82<br>10.32 |
| CH₂—CH₂—CH₂—N—CH₂—(tetrahydrofuran), CH₃ | 38 | salicylate | 110 | C:62.77<br>H: 5.72<br>N: 6.21<br>F: 8.51 | 62.61<br>5.80<br>6.44<br>8.68 |
| CH₂—CH—CH₂—N—CH₂—(tetrahydrofuran), CH₃, CH₃ | 39 | dihydrochloride | 234 | C:55<br>H: 6.29<br>N: 8.74<br>Cl:14.76<br>F:11.86 | 54.85<br>6.15<br>8.59<br>14.52<br>11.63 |

TABLE IX

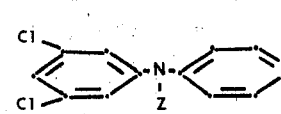

| Z | Example No. | Salt | m.p. of salt °C | Analysis Theory % | Found % |
|---|---|---|---|---|---|
| CH₂—CH₂—CH₂—N(morpholine) | 40 | salicylate | 135 | C:59.81<br>H: 5.17<br>N: 6.54<br>Cl:11.03<br>O:17.43 | 59.73<br>5.06<br>6.68<br>10.88<br>17.61 |
| CH₂—CH—CH₂—N(morpholine), CH₃ | 41 | maleate | 108 | C:52.94<br>H: 5.10<br>N: 6.86<br>Cl:11.57<br>O:23.51 | 52.82<br>5.12<br>6.90<br>11.60<br>23.40 |
| CH₂—CH₂—CH₂—N(morpholine with CH₃,CH₃) | 42 | salicylate | 150 | C:60.89<br>H: 5.56<br>N: 6.26<br>Cl:10.57<br>O:16.70 | 60.70<br>5.60<br>6.40<br>10.30<br>16.80 |

TABLE X

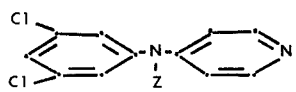

| Z | Example No. | Salt | m.p. of salt °C | Analysis Theory % | Found % |
|---|---|---|---|---|---|
| CH$_2$—CH$_2$—CH$_2$—N◯O | 43 | disalicylate | 162 | C: 59.81<br>H: 5.17<br>N: 6.54<br>Cl: 11.03 | 59.38<br>5.36<br>6.25<br>10.72 |

The following examples illustrate the preparation of compounds of formula I in which Y is an oxygen atom, these compounds being N$^1$-[3'-(N-morpholino)-3'-oxo-propyl]-4-anilino-pyridines.

EXAMPLES 44 – 49

N$^1$-[3'-(N-morpholino)-3'-oxo-propyl]-N$^1$-(3'-chloro-phenyl)-4-amino-pyridine (Example 44) and analogous compounds a. Preparation of 3-[N(3'-chlorophenyl)-N-4'-pyridino)-amino]-propionitrile (nitrile a)

70 g of 4-(meta-chloro-anilino)-pyridine in suspension in 200 cc of acrylonitrile and 4 g of Dowex 2X Standard resin were placed in a flask provided with an agitator. The mixture was heated under reflux for 20 hours. The insoluble starting material dissolved during the course of the reaction. After cooling, the product crystallised from the reaction medium. After elimination of the resin by filtration, the product was recrystallised. A first, very pure, crop of crystals was obtained weighing 55 g, m.p. 120°C (capillary tube); the mother liquor was evaporated to dryness under reduced pressure and the residue was recrystallised from benzene. A second crop weighing 25 g was obtained, m.p. 120°C. The yield was about 90%.

As the product can be recharged on the first mother liquor — which facilitates solubilisation of the starting material and increases the rate of the reaction — it can be considered that, over a number of operations, the yield is nearly 100%.

In the same manner, starting from the corresponding 4-anilino-pyridines, the following intermediates were prepared:

3-[N-(3',5'-dichlorophenyl)-N-(4'-pyridino)-amino]-propionitrile, (nitrile b); m.p. 122°C (capillary tube)

3-[N-(3'-trifluoromethyl-phenyl)-N-(4'-pyridino)-amino]-propionitrile, (nitrile c); m.p. 93°C (capillary tube).

b. Preparation of 3-[N-(3',5'-dichloro-phenyl)-N-(4'-pyridino)-amino]-propanoic acid hydrochloride 25 g of nitrile b, described in (a) above, were added to 50 cc of 50% aqueous hydrochloric acid. The mixture was heated to reflux temperature for 40 hours. On cooling, the amino-acid hydrochloride formed, crystallised. The product was dried under a pressure of 0.01 mm Hg in the presence of caustic soda pellets and weighed 30 g. It was recrystallised in isopropanol after filtration of the ammonium chloride; weight of recrystallised product 24 g, m.p. 210°C (capillary tube).

In the same manner, using the corresponding nitriles, the following intermediates were prepared:

3-[N-(3'-chlorophenyl)-N-(4'-pyridino)-amino]-propanoic acid hydrochloride, (acid 1); m.p. 110°C (capillary tube)

3-[N-(3'-trifluoromethylphenyl)-N-(4'-pyridino)-amino]-propanoic acid hydrochloride, (acid 2); m.p. 66°C (capillary tube)

c. Preparation of N$^1$-[3'-(N-morpholino)-3'-oxo-propyl]-N$^1$-[3'-chlorophenyl]-4-amino-pyridine salicylate 7.8 g of acid 1, described in (b) above, were suspended in 75 cc of methylene chloride and 4.3 g of morpholine were added. There was complete solubilisation of the reactants. 5.3 g of dicyclohexyl-carbodiimide in solution in 25 cc of methylene chloride were then introduced. A precipitate of dicyclohexylurea formed. The reaction mixture was left to stand for 24 hours, then filtered, the methylene chloride solution was washed with water, dried and concentrated to dryness.

An oily base was left which was converted in the monosalicylate. This salt was crystallised from ethyl acetate, m.p. 140°C (capillary tube).

C$_{25}$H$_{27}$N$_3$Cl O$_5$ (mol. wt. = 484.977)

| Analysis: | C% | H% | N% | Cl% | O% |
|---|---|---|---|---|---|
| Theory: | 61.91 | 5.61 | 8.66 | 7.31 | 16.43 |
| Found: | 62.11 | 5.64 | 8.81 | 7.22 | 16.56 |

Using the same procedure as described in Example 44, the compounds indicated in Table XI were prepared; the Table shows, in addition to the structure of the compounds, the melting point of their salts and the results of their analysis.

TABLE XI

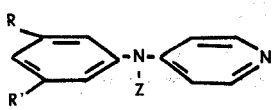

| Example No. | R | R' | Z | Salt | m.p. of salt °C | Analysis Theory % | Found % |
|---|---|---|---|---|---|---|---|
| 45 | Cl | H | CH₂—CH₂—CO—N(CH₃)₂O (dimethylmorpholino) | salicylate | 131 | C:63.34<br>H: 5.90<br>N: 8.21<br>Cl:6.92<br>O:15.62 | 63.25<br>5.92<br>8.16<br>6.84<br>15.69 |
| 46 | Cl | Cl | CH₂—CH₂—CO—N⟩O (morpholino) | salicylate | 162 | C:57.92<br>H: 4.86<br>N: 8.10<br>Cl:13.67<br>O:15.43 | 57.80<br>5.00<br>7.92<br>13.52<br>15.61 |
| 47 | Cl | Cl | CH₂—CH₂—CO—N(CH₃)₂O | hydrochloride monohydrate | 178 | C:51.77<br>H: 5.66<br>N: 9.07<br>Cl:22.98<br>O:10.37 | 51.18<br>5.79<br>9.07<br>23.15<br>10.36 |
| 48 | CF₃ | H | CH₂—CH₂—CO—N⟩O | salicylate | 158 | C:60.34<br>H: 5.06<br>N: 8.12<br>F:11.01 | 60.15<br>4.90<br>8.01<br>10.88 |
| 49 | CF₃ | H | CH₂—CH₂—CO—N(CH₃)₂O | salicylate | 130 | C:61.64<br>H: 5.54<br>N: 7.70<br>F:10.44 | 61.46<br>5.65<br>7.86<br>10.28 |

The compounds according to the invention have central nervous system activity as shown by the following pharmacological tests:

I. Psychotropic properties

A. Behaviour and determination of acute toxicity

The compound under test was injected intravenously into groups of 3 mice with progressive increase in the dose administered (5, 10, 30, 60 and 100 mg/kg of body weight). The test enables the reaction of the animals to be evaluated by examining a series of characteristics (spontaneous activity, tremors, sensitivity to touch, sensitivity to pain, ataxia, and exophthalmos) which are classed from 0 to 8 or 4 to 8 according to the reaction being studied. The test also gives an approximate value for LD 50.

The results are given in Table A below, which indicates the dose (in mg/kg of body weight) at which a given effect appears.

The LD 50 of the compounds studied are in the region of 80 mg/kg and in some cases are as high as 110 mg/kg (compounds of Examples 3 and 40) and 125 mg/kg (Examples 11 and 28). Some compounds are more toxic.

The compound of Example 39 has LD 50 of 25 mg/kg
The compound of Example 47 has LD 50 of 45 mg/kg
The compound of Example 29 has LD 50 of 45 mg/kg The symptoms observed in the course of the behaviour study were unobtrusive and were only produced in the majority of cases with strong doses and immediately after injection. The overall picture of the activity of the various compounds can be summarised as follows:

The compound of Example 2 was slightly exitant as were those of Examples 29 and 48.

The compound of Example 3 caused rather marked excitation (irritability, Straub phenomenon) as did those of Examples 35, 37 and 42.

On the other hand, the compounds of Examples 4, 46, 47 and 49 were very slightly depressant and those of Examples 36, 40 and 45 showed little or no activity.

TABLE A

| Compound of Example | 2 | 16 | 3 | 4 | 30 | 40 | 29 |
|---|---|---|---|---|---|---|---|
| Overall behavior | Predominant excitant action | Some excitant action | Rather marked excitation | Marked excitation | Rather marked excitation | Rather marked excitation | Slightly excitant |
| LD50 in mg/kg (intravenous) | 95 | 80 | 110 | 80 | 80 | 110 | 45 |
| Spontaneous activity | ↘at 60 | ↘at 60 | ↘at 100 | ↗or ↘at 60 | | ↘at 100 | ↗at 30 after inj. |
| Irritability, Sensitivity to touch | | | ↗at 30 | ↗at 10 | ↗at 30 | ↗at 30 | |
| Tremors/ Convulsions | ↗at 60 | + at 100 | + at 60 | + at 10 | + at 30 | + at 100 | + at 30 after inj. |
| Ataxia | | | + at 60 | + at 60 | | + at 100 | + at 30 after inj. |
| Exophthalmos | + at 60 | + at 60 | | | | | + at 30 after inj. |
| Straub phenomenon | | | | | | | + at 30 after inj. |

| Compound of Example | 35 | 36 | 37 | 39 | 41 | 42 | 45 | 46 | 47 | 48 | 49 |
|---|---|---|---|---|---|---|---|---|---|---|---|
| Overall behavior | Somewhat excitant | Average activity | Excitant | Average activity | Depressant | Some excitant action | Depressant | Slightly depressant | Slightly depressant | Slightly depressant | Slightly depressant |
| LD50 in mouse in mg/kg (intravenous) | 80 | 80 | 80 | 25 | 80 | 80 | 80 | 80 | 45 | 90 | 80 |
| Spontaneous activity | slight ↘at 60 | | | | slight ↘at 10 ↘at 30 | slight ↘at 60 | ↘at 30 and 60 | ↘at 60 after inj. | | slight ↘at 60 | ↘at 60 |
| Irritability Sensitivity to touch | | | ↗at 60 | | | ↗at 30 | | slight ↘at 60 | slight ↘at 30 | ↗at 60 | ↘at 60 |
| Tremors/ convulsions | + at 60 after inj. | + at 60 after inj. | + at 60 after inj. | | + at 30 after inj. | + at 60 after inj. | + at 30 and 60 | + at 30 after inj. | + at 30 after inj. | + at 60 after inj. | + at 60 after inj. |
| Ataxia | + at 30 after inj. | + at 30 after inj. | + at 60 after inj. | + 30 after inj. | + at 30 after inj. | + at 60 after inj. | + at 60 after inj. | + at 30 after inj. | + at 30 after inj. | + aT 60 after inj. | + at 60 after inj. |
| Exophthalmos | +at 60 after inj. | | | | | | | | | + at 60 after inj. | |
| Straub phenomenon | + at 60 after inj. | + at 60 | + at 60 after inj. | | + at 60 | + at 60 after inj. | | + at 60 after inj. | | | |

B. Exploratory tests of psychotropic activity

The tests on the central nervous system were made on groups of 10 male mice; the amounts injected were a greater or lesser fraction of the LD 50, depending on the tests.

The results are shown as a percentage of the animals which react, expressed as a function of time. They are given in Table 2 below and classified as follows:

0 = no reaction
± = doubtful reaction
+ = positive reaction.

The arrows ↗ or ↘ indicate an increase or decrease and the amount of the effect as percentage.

1. The activity of the compounds according to the invention has been evaluated by means of the *Rota-rod test* (Tripod, J. and coll., *Arch. int. Pharmacodyn.*, 1957, 112, 319); the *chimney test* (Boissier, J.R. and coll., *Medicina Exper.*, 1960, 3, No. 1, 81), and the *traction test* (Courvoisier S.; *J. Clin. Exp. Psychopath.*, 1956, 17, 25-37).

The compounds according to the invention which appeared interesting from this screening were then used in the following tests:

2. Potentiation of or antagonism to barbiturate narcosis

In order to demonstrate potentiation, the barbiturate (penthiobarbital) was injected intraperitoneally in doses sufficient to cause short sleep and varying between 40 and 50 mg/kg according to the batches of mice, 15, 30 or 45 minutes after the compound under test. In order to study antagonism, 55 mg/kg of penthiobarbital was injected, causing all the animals to sleep.

The length of sleep was noted; the criterion of sleep is the loss of the redressement reflex. The results are shown as the percentage of animals asleep, expressed as a function of time.

The compounds under study were found not to potentiate or antagonise sleep produced by barbiturates. The compounds of Examples 3, 4 and 35, however, markedly potentiate narcosis, the compound of Example 35 being the most active at a dose of 40 mg/kg.

3. Potentiation of chloral narcosis

The method used is described by BUCHEL, L. and coll. (*Therapie* 1962, XVII, pp. 1053-1094). 15 or 20 Minutes after the compound under test had been intraperitoneally injected, chloral hydrate was intraperitoneally injected into batches of 10 mice in doses of 325 mg/kg), (causing all the control animals to go to sleep). The length of sleep was noted in the same way as for penthiobarbital narcosis and the results were shown as the percentage of animals asleep, expressed as a function of time.

This test confirms the results of the tests for the potentiation of penthiobarbital narcosis. The compounds in Examples 3 and 4 potentiate the narcosis.

4. Potentiation or antagonism of the effects of pentetrazol 30 to 45 Minutes after the compound under test had been administered, a convulsive, non-mortal dose of pentetrazol (30 to 45 mg/kg) was intravenously injected when potentiation was required, or a nearly 100% lethal dose (60 mg/kg) if it was desired to demonstrate an antagonistic effect. The results comprise 3 percentages: percent of tremors, percent of fits and percent of deaths.

None of the products tested is antagonistic, but most potentiate the effects of pentetrazol. The most active compound is that of Example 4 and marked activity is shown by the compounds of Examples 3, 35, 42 and 44.

5. Actography

The method consists in recording the number of times an animal passes in front of two perpendicular light rays. Mice, either alone or in groups of two, were introduced into activity cages of the Dews type after the compounds under test had been injected intravenously.

The activity was measured after 5, 10 and 15 minutes. The results are expressed as a percentage of increased or decreased activity with respect to the control animals.

In general, activity decreases after the compounds under test are injected. When the intravenous injection was equal to ¼ of the LD 50, activity decreased by an average of 30%.

The most active compounds are those of Examples 3, 4 and 40 and the compound of Example 35, which reduces activity by 50% during the first 5 minutes.

6. Anti-amphetamine activity, measured by actography

This activity was evaluated by actography. Mice were given a subcutaneous injection of D-amphetamine tartrate at a dosage of 10 mg/kg. At the same time, the compound under test was administered intravenously to the animals under treatment, while the solvent was given to the control animals. The activity of the mice was measured in the actimeter after 5, 10 and 15 minutes; the injection was made 15 or 30 minutes before measuring time 0.

The new compounds are relatively antagonistic to the effect of amphetamine on activity, as measured by actography. The results are practically parallel to those obtained for the activity test by actography. The most active compounds are those of Examples 3, 4 and 35.

7. Potentiation of the toxicity of amphetamine on groups of mice

Batches of 10 mice grouped together showed agitation after receiving intraperitoneal injections of 15 mg/kg d-amphetamine tartrate. A quarter of an hour later, 30 mg/kg of the compound of Example 2 was intraperitoneally injected. The number of deaths after 8 and 24 hours were noted.

The toxicity of the amphetamine group is considerably potentiated by the compound of Example 30 in doses of 20 mg/kg, and slightly by the compound of Example 2 in doses of 30 mg/kg. The compounds of Examples 38, 40 and 44 are also active.

8. Anti-reserpine activity

Mice weighing approximately 20 g were given intraperitoneal injections of 3 mg/kg reserpine. 16 hours later, the compound under test was intravenously injected in doses of 30 mg/kg and the activity was compared with that obtained with imipramine orally administered in doses of 10 mg/kg.

Tests, compared with results on control animals treated with reserpine alone, were made to show the:
1. activity measured by actography.
2. degree of ptosis.
3. the central temperature.

The compounds of Examples 2 and 35 are not very active except in small doses (1/10 of the LD 50) but large doses of compounds of Examples 3, 4 and 44 are required to demonstrate anti-reserpine activity. The compound of Example 35 has an effect both on temperature and on ptosis.

9. Anti-cataleptic activity

The test was made on rats which were given intraperitoneal injections of 15 mg/kg prochlorpemazine (Tementil). A state of catalepsy resulted, as could be seen by the crossing of homolateral paws. The compound under test was intraperitoneally injected in doses of 100 mg/kg. The effects were compared with those of amphetamine.

The compounds of Examples 2, 35 and 41 have quite a marked anticataleptic action.

10. Potentiation of toxicity of yohimbine

The compounds under test were orally administered to male mice with an average weight of 20 g; 1 hour later the mice were given a subcutaneous injection of 30 mg/kg of yohimbine. The mice were in groups of 10. Next day the number of deaths was recorded. The results are expressed as percentage mortality. The object of the test was to show anti-depressant activity.

The most important substances in this respect are the compounds of Example 7, 24 and 34. Compounds of Examples 37, 35 and 45 are less active.

11. Anti-tremorine test

The compounds under test were injected intravenously into groups of 5 mice and 20 minutes afterwards 30 mg/kg of tremorine (1,4-dipyrrolidine-2-butyne) was administered intraperitoneally. The amount of salivation and tremors, with respect to control animals which had only been given tremorine, was measured 15, 30 and 60 minutes after the tremorine had been injected. The results are classified by crosses (0 to 5 crosses for tremors and 0 to 4 crosses for salivation).

Most of the compounds according to the invention antagonise tremors caused by tremorine. The antagonising effect on salivation was most marked.

The compounds of Examples 29, 30, 35, 36, 38, 41, and 45 are considerably antagonistic to tremors and have a marked effect on salivation.

TABLE B

| Compound of Example | LD50 in mg/kg, intravenously injected in mice | Doses administered in tests, in mg/kg | Test results for psychotropic activity | | | | |
|---|---|---|---|---|---|---|---|
| | | | Potentiation of penthiobarbital narcosis | Potentiation of chloral narcosis | Potentiation of pentetrazol | Activity measured by actography | Anti-amphetamine action |
| 2 | 95 | 30 | ± | ± | ++ | ↘ at 30mg/kg | ± |
| 3 | 110 | 30 | ± at 40mg/kg | ++ | ± at 40mg/kg | ↘ at 20mg/kg | ↘(−50%) at 20mg/kg |
| 4 | 80 | 30 | ++ | ++ | ++ | ↘70% at 30mg/kg | + at 10 and 20 mg/kg |
| 7 | | | | | | | |
| 24 | | | | | | | |
| 29 | 45 | 15 | 0 | | 0 | | |
| 30 | 80 | 30 | ± | | ++ | 0 | 0 |
| 34 | | | | | | | |
| 35 | 80 | 30 | ± at 30mg/kg + at 40mg/kg | 0 | + | ↘++ at 20mg/kg | ++ at 20mg/kg |
| 36 | 80 | 30 | 0 | | ± | ↘+ at 20mg/kg | + at 20mg/kg |
| 37 | 80 | 30 | 0 | 0 | + | ↘± at 20mg/kg | ± at 20mg/kg |
| 38 | 50 | 15 | 0 | | ± | ↗± at 10mg/kg | 0 at 10mg/kg |
| 40 | 110 | 30 | ± at 40mg/kg | 0 | ++at 40mg/kg | at 20mg/kg | ± at 20mg/kg |
| 41 | 80 | 30 | | | 0 | ↘+ at 20mg/kg | ± at 20mg/kg |
| 42 | 80 | 30 | ± | | ++ | ↘+ at 20mg/kg | 0 |
| 44 | 80 | 30 | ± at 40mg/kg | ± | ++ | | ± |
| 45 | 80 | 30 | 0 | | ± | ↘± at 5mg/kg | 0 |

| Compound of Example | Toxicity of amphetamine group | Anti-reserpine activity | Anti-cataleptic activity | Potentiation of toxicity of yohimbine | Anti-tremorine action |
|---|---|---|---|---|---|
| 2 | ± | ++ at 10mg/kg | ++ at 100mg/kg | ++ | salivation 0 tremors ++ |
| 3 | ± at 25mg/kg | 0 at 10mg/kg ++ at 50mg/kg | 0 at 50mg/kg | 0 | |
| 4 | | 0 at 20mg/kg ++ at 40mg/kg | + at 100mg/kg | ++ | salivation 0 tremors ++ |
| 7 | | | | ++ at 60mg/kg per os | |
| 24 | | | | ++ at 60mg/kg per os | |
| 29 | | 0 | | 0 (at 30mg/kg) | salivation + tremors ++ |
| 30 | ++ at 20mg/kg | | 0 at 70mg/kg | | salivation + tremors ++ |
| 34 | | | | ++ at 80mg/kg | |
| 35 | | ++ at 10mg/kg | + | + at 60mg/kg | salivation + tremors ++ |
| 36 | | | | 0 at 60mg/kg | salivation + tremors ++ |
| 37 | | | | + at 60mg/kg | salivation ± tremors + |
| 38 | + at 15mg/kg | | 0 at 50mg/kg | | salivation + tremors + |
| 40 | + at 20mg/kg | 0 | 0 at ± | 0 | salivation ++ tremors ± |
| 41 | | 0 at 20mg/kg | ++ at 80mg/kg | 0 | salivation + tremors ++ |
| 42 | | | | 0 | salivation ++ tremors + |
| 44 | + at 20mg/kg | + at 40mg/kg | ± | | |
| 45 | | ± | ++ at 80mg/kg | + at 60mg/kg | salivation + tremors ++ |

In summary, the study of the psychotropic activity of the compounds according to the invention shows that they decrease the normal activity of the animals (actography) and the activity of excited animals (treated with amphetamine). In spite of this depressant action on activity the compounds only slightly potentiate the effects of barbiturates. On the other hand, they potentiate the effects of pentetrazol.

These paradoxical effects (they are both nervous depressants and excitants of the pentetrazol type) are confirmed by a study of the anti-depressant action of the compounds according to the invention. The compounds are anti-cataleptic; the yohimbine test shows that the central effects of noradrenaline are potentiated, while the anti-tremorine test shows a certain central anti-cholinergic action.

Table C below shows the comparative activity of 6 compounds according to the invention, using examples depending on the different tests. For each test, the compounds have been given a mark from 0 to 7, indicating the amount of activity.

The Table shows that the compound of Example 2 behaves like a weak anti-depressant and the compound of Example 40 behaves like a weak tranquilliser. The compound of Example 44, on the other hand, is relatively excitant. The compounds of Examples 3, 4 and 35 show the aforementioned paradoxical effects to a very marked degree (they depress activity, they have an anti-amphetamine action and potentiate barbiturate sleep, whereas they are excitants in that they potentiate the effects of cardiazol. They also have an anti-reserpine effect.

TABLE C

Comparative activity of 6 derivatives of 4-anilino-pyridine, depending on the tests used.

| EXAMPLES | 2 | 4 | 3 | 40 | 44 | 35 |
|---|---|---|---|---|---|---|
| Tests used | | | | | | |
| Actography | 4 | 4 | 6 | 7 | 2 | 5 |
| Potentiation of pentetrazol: percentage of fits affected | 1 | 7 | 5 | 2 | 5 | 5 |
| Potentiation of pentetrazol: percentage of deaths affected | 4 | 5 | 2 | 4 | 1 | 7 |
| Potentiation of barbiturate narcosis | 2 | 6 | 6 | 2 | 2 | 7 |
| Anti-amphetamine activity | 2 | 6 | 7 | 3 | 1 | 6 |
| Anti-reserpine activity | 7 with small dose 0 with large dose | 4 with large dose | 3 with large dose | 0 | 2 with large dose | 6 with small dose 0 with large dose |
| Anti-cataleptic activity | 4 | 2 | 0 | 0 | 1 | 5 |
| Tentative pharmacological classification of product, based on total activity | Anti-depressant | — | — | weak tranquilliser | relatively excitant | — |

II. Test for anxiety-relieving activity

The "food-taking test" was suggested by the work of STOLERMAN, I. P. (Nature, 1967, 215, 1518–9) and JANSSEN (J. of Pharmacol. 1961, 13, 513–530).

When rats were conditioned to take their food during a limited period only each day, it was found that small, non-depressant doses of some tranquillisers, neuroleptic or anxiety-relieving substances caused an increase in the amount of food taken during the limited feeding period, compared with the amount taken by the control animals.

Rats having an initial weight of 110 to 130 g were conditioned to eat for only 2 hours each day but were allowed to drink without restriction.

At least 15 days conditioning was necessary before any experiments were made.

On the day of the test, the animals were divided into batches of 5 and weighed just before the test compound was administered orally, in a 5% suspension of gum arabic in physiological solution, one hour before the food arrived. During the hour, the animals were allowed to drink as much as they wished. During the next two hours, they were given their food and were weighed at the end of this period. The increase in weight was calculated and the results were expressed as a percentage increase or decrease in the food taken, compared with the control animals.

The compounds of Examples 2 and 4 were studied for their effect in conjunction with standard anxiety-relieving substances and amphetamine, which is known to reduce the appetite and cause anxiety.

With regard to the standard anxiety-reducing substances, small non-depressive doses were found to result in an increase in food intake, compared with the control animals. The effect increased and then decreased as the dose was progressively increased. The result was the same for compounds of Examples 2 and 4; the latter compound appeared rather less active.

The results are shown in the following Table D.

TABLE D

The effect of the compounds of Examples 2 and 4 and of standard products on the food-intake test on male Charles River rats (substances orally administered, in suspension in a 5% gum arabic physiological solution)

Percentage increase or decrease in food intake, compared with control animals

| Products \ Doses in mg/kg | 0.1 | 0.2 | 0.5 | 1 | 2 | 5 | 10 | 20/25 | 40/50 | 100 | 200 |
|---|---|---|---|---|---|---|---|---|---|---|---|
| Librium | | | | | +34% | +40.5% | +85.5% | +61.5% | +31% | | |
| Equanil | | | | | | | | +42.5% | +47.5% | +62% | +16.5% |
| Valium | | | | | | +47% | +40.5% | +4% | | | |
| Amphetamine | | | | −12% | −48.5% | −69% | −85% | | | | |
| Largactil | −5.5% | +23% | +52% | −4% | −9.5% | −22.5% | −67.5% | −100% | | | |
| Compound of Example 2 | | | | | +64% | +44.5% | +74% | 0 | −14% | | |
| Compound of Example 4 | | | | | +11.5% | +30.5% | +40.5% | | | | |

The compounds according to the invention, therefore, have an action on the central nervous system such that they are therapeutically indicated to be very interesting anxiety-relieving agents.

III. Anti-inflammatory action

The anti-inflammatory action on rats was tested by three different methods:

a. Oedema of the paw, caused by kaolin

This is derived from the method proposed by S. GARCET (*Therapie*, 1958, 13, pp. 549–555).

0.15 ml of a 10% kaolin solution suspension in a 9 parts per thousand NaCl solution was injected in the plantar pads of the left back paws of male rats weighing 130 to 150 g. The animals, divided into groups of 8 to 10 rats, were treated in the following manner 3 hours after the kaolin had been injected:

Control animals: intraperitoneal injection of 1 ml/100 g of 9 parts per thousand NaCl solution.

Group treated with phenyl butazone: 100 mg/kg of this product were injected intraperitoneally, the product being suspended in 9 parts per thousand NaCl solution + 1% carboxymethyl cellulose.

Group treated with the compounds under test: intraperitoneal injection of 1 ml/100 g of solutions of suitable concentration.

The volume of the right paw was measured (used for reference) and of the paw treated with the anti-inflammatory agent, at the moment when the substances were administered, and 2, 4 and 24 hours afterwards. The measurement was made with a phethysmograph. In each group the average percentage inflammation of paws injected with kaolin was calculated with respect to paws not injected. Finally, the percentage inhibition of inflammation by the substances tested, in the case of the groups under treatment, was expressed in comparison with the control group.

b. Oedema of paw caused by carrageenine

The method used is that described by WINTER, C. A., RISLEY E. A. and NUSS, G. W. (*Proc. Soc. Exp. Biol. Med.*, 1962, III, pp. 544–547).

Groups of 8 rats, identical with the earlier groups, were treated in the following manner:

Control group: intraperitoneal injection of 1 ml/100 g of a 9 parts per thousand NaCl solution;

Group treated with phenyl butazone: 100 mg/kg (1 ml/100 g) of a suspension of phenyl butazone in 1% carboxymethyl cellulose was administered orally;

Groups treated with the compounds after test: intraperitoneal injection of the compounds in solution in concentrations such that the volume injected was 1 ml/100 g.

One hour after the phenyl butazone, or immediately after the compounds under test had been injected, 0.05 ml of a 1% suspension of carrageenine in physiological saline solution was injected under the plantar surface of the rats' back left paws.

The volume of the paws was measured in the same way as in the previous test and the percentage inhibition of inflammation is given for three different times during the 24 hours following the administration of the inflammatory agent.

c. Oedema of paw caused by serotonine

This test, which is designed to show the origin of the anti-inflammatory activity, was suggested by the work of PARRAT and WEST (Brit. J. Pharmacol. 1958, 13, 65) and SFONE and colleague (J. Pharmacol, Experimental. Therap. 1961, 131, 73). Groups of 6 male rats were given intraperitoneal injections of the compound under test or the standard substances (6 mg/kg of Largactil). 30 minutes later, 0.05 ml of a solution of serotonine creatine sulphate containing 12 mg serotonine was injected into the rear left paws. The results, which were taken 30 minutes, 1 hour and 3 hours after the serotonine injection, show the percentage inhibition of inflammation compared with the control animals.

Test results for anti-inflammatory activity

The tests of oedema of the paw due to kaolin show that the compounds of Examples 7 and 11 have a marked anti-inflammatory action in doses of 20 or 30 mg/kg, whereas the compounds of Examples 24, 3, 31 and 40 have a weaker action.

The oedema due to carrageenine confirms the anti-inflammatory action of the compound of Example 7; The compound of Example 40 strongly inhibits the inflammatory process when administered in doses of 100 mg/kg. (The effect of this latter product is as great as that of phenyl butazone orally administered in doses of 100 mg/kg).

The test of oedema due to serotonine shows that the compound of Example 11, when intraperitoneally administered in doses of 30 mg/kg, inhibits more than 50% of the inflammation and has an activity comparable to doses of 6 mg/kg chloropromazine. The compounds of Examples 2 and 7 also have a marked action. (It is noteworthy that phenyl butazone does not affect inflammation produced by serotonine).

Compounds according to the invention, therefore, are very effective anti-inflammatory agents, more particularly the compounds of Examples 7 and 11.

The compounds according to the invention can be used to treat diseases of the central nervous system. They can be administered orally or parenterally, in normal pharmaceutical forms, inter alia in the form of pills, capsules, solutions and suspensions.

The invention also relates to pharmaceutical compositions containing at least one of the compounds of formula I as the active agent in a suitable pharmaceutical excipient.

A suitable formulation is given below for a compressed table containing 20 mg of active substance:

| | | |
|---|---|---|
| Compound of Example 2 (in the form of the salicylate) | 20 | mg |
| Polyvinyl pyrrolidone | 9.5 | mg |
| Maize starch | 48 | mg |
| Bicalcium phosphate | 100.15 | mg |
| Talcum | 9.5 | mg |
| Magnesium stearate | 2.85 | mg |
| | 190 | mg |

Pharmaceutical absolute alcohol q.s.

Clinical study

The compound of Example 2 has been used in clinical trials and has been administered in several cases of anxiety depression. The patients were given 3 to 6 tablets per day containing 20 mg of the active compound The results from 6 cases are given below.

| 1st case | Mr. M. aged 23 |
|---|---|
| Diagnosis: | In-patient since January 1967 depression and anxiety syndrome with a neurotic background. |
| Treatment: | total duration, 4 weeks |
| Dose: | At first 3, then 5 tablets per day |
| 11th day: | a definite improvement |
| 28th day: | the patient was considered to be in normal health, though still neurotic, of course. He was expected to leave hospital shortly. |

| 2nd case | Mrs. D. F., aged 48 |
|---|---|
| Diagnosis: | anxiety depression |
| Treatment: | 4 tablets per day. After 4 days, the patient's health had improved. She was cured in a week and left hospital after 15 days. |

| 3rd case | Mrs. A. D., Aged 34 |
|---|---|
| Diagnosis: | anxiophobic neurosis |
| E.E.G.: | rapid lines without specific signs |
| Treatment: | 5 tablets per day. At the end of 15 days the result was excellent. The patient left hospital. The E.E.G. was normal, without any special sign. |

29
-continued

| | |
|---|---|
| 4th case | Miss B. A., aged 23 |
| Diagnosis: | emotional immaturity, shown by enuresis and encopresis. |
| Treatment: | 4 tablets per day for 15 days. The patient left hospital on the 15th day, and was considered cured. |
| 5th case | Mrs. C. S., aged 43. |
| Diagnosis: | depression and attempted suicide |
| E.E.G. | normal |
| Treatment: | 6 tablets per day for 6 weeks. The patient left hospital after 2 months, in a very satisfactory state (the E.E.G. was still normal) |
| 6th case | Mr. D. C., aged 31 |
| Diagnosis: | anxiety depression, with attempted suicide |
| Treatment: | 3, then 4, then 5, then 6 tablets per day |
| 10 days later: | reactivation of conflicts |
| 25th day: | definite improvement. The patient left hospital after 2 months. |

A second clinical test was made on the compound in Example 2, administered in the same doses as for the first series of tests.

These pilot experiments were continued for a year and a half in three different hospitals, on exactly 100 patients. Some patients (47%) had nervous troubles: anxiety neurosis, depression, phobias, etc., while others were psychotic (Schizophrenia, chronic delirium, melancholia, etc.).

The experiments showed that the compound according to the invention is an active substance and easily tolerated. It relieves anxiety and has anti-depressant properties when given to neurotics.

The results for the 100 patients treated were similar to the earlier results. Good results were obtained for 60% of the serious neuroses. The proportion rises to 71% if depressions are excluded. By "good results" we mean complete cure or a very great improvement.

The compound is generally less active with psychoses, with the apparent exception of atypical depressions.

The clinical tests show that the compounds according to the invention having the structure defined previously can be successfully used for the treatment of depression or anxiety states.

We claim:
1. An N-amino-substituted 4-anilinopyridine of the formula

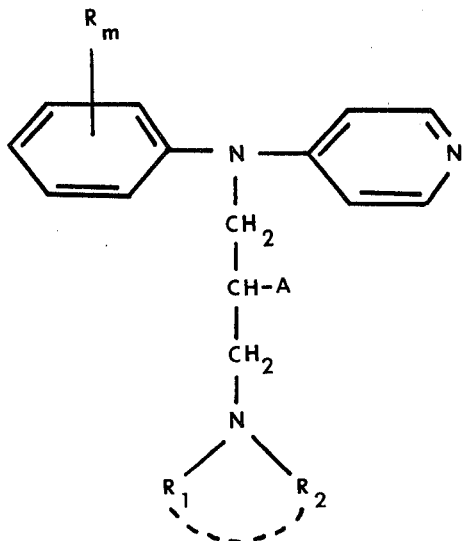

wherein
R is selected from the group consisting of hydrogen, chlorine, trifluoromethyl, methyl and ethyl;
m is the integer 1 or 2;
A is hydrogen or methyl;
$R_1$ is alkyl having 1 to 4 carbon atoms;
$R_2$ is alkyl having 1 to 4 carbon atoms the same as or different from $R_1$, tetrahydrofurfuryl, or $R_1$ and $R_2$ together with the nitrogen atom to which they are attached form morpholino, 2,6-dimethylmorpholino, piperidino, pyrrolidino or piperazino;
or the non toxic acid addition salts thereof.

2. The compound of claim 1, which is $N^1$-[3'-(N-morpholino)-propyl]-$N^1$-(metachlorophenyl)-4-amino-pyridine.

3. The compound of claim 1, which is $N^1$-[3'-(N-morpholino)-propyl]-$N$-$^1$-(metatrifluoromethyl-phenyl)-4-amino-pyridine.

4. The compound of claim 1, which is $N^1$-[2'-methyl-3'-(N-morpholino)-propyl]-$N^1$-(metachlorophenyl)-4-amino-pyridine.

5. The compound of claim 1, which is $N^1$-[2'-methyl-3'-(N-morpholino)-propyl]-$N^1$-(metatrifluoromethyl-phenyl)-4-amino-pyridine.

6. A substituted 4-anilinopyridine according to claim 1 in which $R_1$ and $R_2$ together with the nitrogen atom to which they are attached is morpholino.

7. A substituted 4-anilinopyridine according to claim 1 in which $R_1$ and $R_2$ together with the nitrogen atom to which they are attached is 2,6-dimethylmorpholino.

* * * * *

UNITED STATES PATENT AND TRADEMARK OFFICE
CERTIFICATE OF CORRECTION

PATENT NO. : 3,928,341
DATED : December 23, 1975
INVENTOR(S) : Jean-Louis Delarue and Albert Debarge It is certified that error appears in the above-identified patent and that said Letters Patent are hereby corrected as shown below:

Page 1 of the patent in the ABSTRACT,

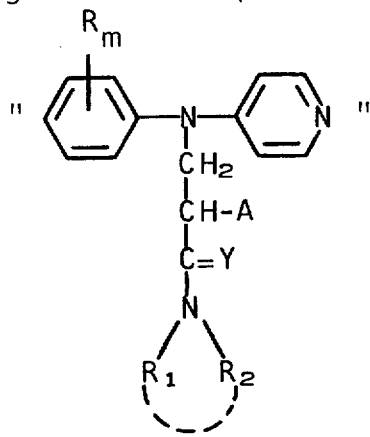   should read   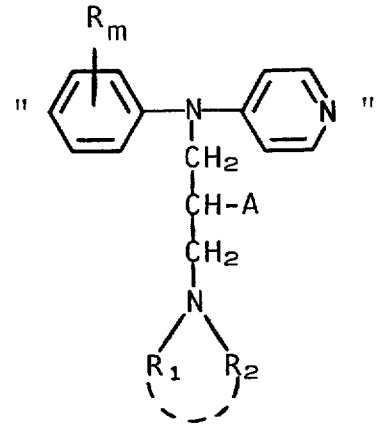

Columns 5-6, Table I, Example No. 8, the salt reads "salilcylate" and should read "salicylate"; Columns 5-6, Table II, Example No. 9, the structure

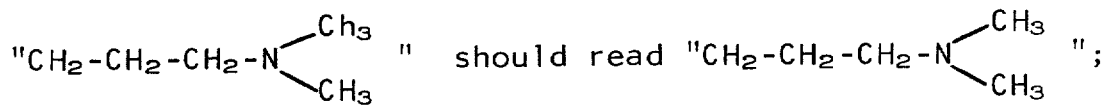

UNITED STATES PATENT AND TRADEMARK OFFICE
CERTIFICATE OF CORRECTION

PATENT NO. : 3,928,341
DATED : December 23, 1975
INVENTOR(S) : Jean-Louis Delarue and Albert Debarge It is certified that error appears in the above-identified patent and that said Letters Patent are hereby corrected as shown below:

Columns 11-12, Table VIII, Example No. 35, the structure

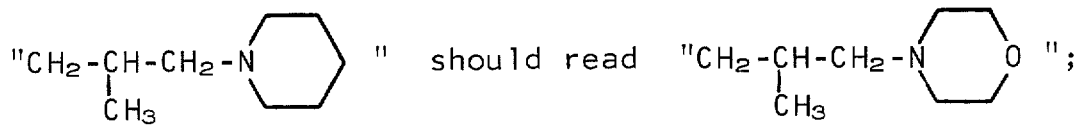

Columns 19-20, the first column of Table A, "LD50", first occurrence, should read "LD50 in mouse"; Columns 23-24, Example No. 40 of Table B, under the column for Activity measured by actography, " at 20 mg/kg" should read "⁎at 20 mg/kg"; Column 27, line 29, "after" should read "under"; Column 30, line 38, "-N-$^1$-" should read "-N$^1$-".

Signed and Sealed this

Twenty-first Day of September 1976

[SEAL]

Attest:

RUTH C. MASON
Attesting Officer

C. MARSHALL DANN
Commissioner of Patents and Trademarks